United States Patent [19]

Kiejzik

[11] Patent Number: 4,506,976
[45] Date of Patent: Mar. 26, 1985

[54] MICROFILM INSERTER/VIEWER APPARATUS

[76] Inventor: Paul A. Kiejzik, 2907 Monterey Ct., Springfield, Pa. 19064

[21] Appl. No.: 533,809

[22] Filed: Sep. 19, 1983

[51] Int. Cl.³ .................... G03B 13/28; B65B 63/00
[52] U.S. Cl. ........................ 355/45; 53/520; 355/50; 355/54
[58] Field of Search .............. 53/520; 355/43, 45, 355/50, 51, 53, 54, 46

[56] References Cited

U.S. PATENT DOCUMENTS

| | | | |
|---|---|---|---|
| 3,457,697 | 7/1969 | Engelstein | 53/520 |
| 4,003,187 | 1/1977 | Kiejzik | 53/520 |
| 4,050,811 | 9/1977 | Russell | 355/50 X |
| 4,123,157 | 10/1978 | Klose et al. | 355/45 X |
| 4,167,842 | 9/1979 | Dorman | 53/520 |
| 4,188,114 | 2/1980 | Gensike et al. | 355/45 X |
| 4,231,214 | 11/1980 | Kiejzik | 53/520 |
| 4,258,531 | 3/1981 | Kiejzik | 53/520 |
| 4,432,637 | 2/1984 | Baschung | 355/50 X |
| 4,464,881 | 8/1984 | Dorman | 53/520 |

*Primary Examiner*—Richard A. Wintercorn
*Attorney, Agent, or Firm*—Woodcock Washburn Kurtz Mackiewicz & Norris

[57] ABSTRACT

A storage jacket-film strip segment insertion apparatus having enhanced strip viewing and ease of use capabilities. A platform assembly having a tray is provided for receiving a storage jacket into which film strip segments are inserted by an associated film strip feed head. The tray is light-translucent or transparent to allow the jacket to be back-lit for viewing or copying through a provided transparent tray cover and projection lens. The tray and feed head are movable with respect to one another to provide feed head access to various portions of the storage jacket and a track assembly is provided attached to the tray for positive engagement and alignment of the tray with the feed head. The tray cover is attached to the platform assembly in such a manner as to cause the track to disengage from the feed head when the cover is raised, allowing the tray and feed head to be repositioned with respect to one another. A pair of viewing apertures are provided in the feed head lying within a common plane so as to be viewable without refocusing of the projection lens. The tray cover and light transparent covers provided over the apertures form a common plane for supporting the projection lens at the same predetermined distance over a storage jacket on the tray and film strip on the feed head thereby minimizing refocusing requirements. The tray and feed head assembly are movable with respect to the lens so that all portions of the jacket and the viewing apertures in the feed head are accessible.

16 Claims, 8 Drawing Figures

MICROFILM INSERTER/VIEWER APPARATUS

FIELD OF THE INVENTION

This invention relates to improved apparatus for inserting film segments, particularly microfilm strip segments, into transparent storage jackets.

BACKGROUND OF THE INVENTION

Devices for the insertion of film strip segments into transparent storage jackets are well-known and are illustrated, for example, in U.S. Pat. No. 4,258,531, also to Kiejzik. The present invention includes several new features not found in the apparatus described in that patent. That apparatus includes a feed head assembly which propels a microfilm strip along an arcuate feed path to a storage jacket supported on a platform adjoining the feed head assembly. The jacket is aligned by the platform with respect to the feed head assembly and film strip feed path. The feed head assembly includes a blade for severing the film strip into segments. A pair of apertures on either side of the blade allow light to pass from a bulb or other light source through the feed path and microfilm strip frames on either side of the blade to a view screen, so that an operator may view the last frame to be inserted into the storage jacket and the next frame available for insertion.

One problem with the apparatus depicted in the aforesaid U.S. Pat. No. 4,258,531 is that the two apertures do not lie within a common plane with respect to the projection lens making it difficult, if not impossible, to simultaneously obtain sharply focused images of both frames opposite the two apertures. It would be desirable to provide such a capability.

Another shortcoming of the apparatus described in the aforesaid U.S. Pat. No. 4,258,531, and all other currently available film strip segment storage jacket loading devices, is that the individual film strip segments are no longer viewable in the apparatus once they leave the feed head. In order to view or read the images of the film strip segments in a storage jacket, the jacket must be removed from the insertion apparatus and place in a conventional reading or reading and copying device. It would be desirable to provide, as a part of the operating capacity of an insertion apparatus, the ability to view and/or hard copy the images on the film strip segments stored in a storage jacket being held by the insertion apparatus.

Lastly, the platform or tray supporting the microfilm storage jacket in the insertion apparatus described in the aforesaid U.S. Pat. No. 4,258,531 is supported by elements which also provide for transverse positioning of the platform and jacket with the feed head assembly and feed path whereby any of several storage pockets within the storage jacket may be aligned with and filled by the one feed head assembly. In that apparatus, the platform is supported on a frame by components which hold the platform at predetermined locations with respect to the frame. A fine adjustment is provided for precise alignment of the platform with the frame and thereby with the separate feed head assembly. It would be desirable to provide means for aligning the platform positively with the feed head assembly to minimize misalignment and the necessity to make alignment adjustments. Each of the aforesaid problems is solved by one or more aspects of the subject invention.

SUMMARY OF THE INVENTION

An important aspect of the invention is the provision of the capability for viewing the contents of a film strip storage jacket in the jacket holder of a film strip insertion apparatus. According to this aspect of the invention, an insertion apparatus is provided with a feed head assembly having a film strip feed path for feeding a film strip segment through the assembly. A holder assembly is provided adjoining the feed head assembly for positioning a film strip storage jacket to receive the film strip segment from the film strip feed path. A light bulb or other suitable light source illuminates the film strip jacket, and a conventional optical projection system or other suitable means is provided for transmitting an image of the illuminated film strip storage jacket for display or copying.

In one important feature of the described embodiment, a light transmissible platform is provided as part of the storage jacket holder assembly and supports a storage jacket from beneath, while the light source back-lights the film strip jacket by illuminating it through the platform.

For ease of use, the feed head assembly and holder assembly are preferably mounted on a carriage for movement with respect to a frame supporting the projection system. It is envisioned that other structural arrangements which provide relative movement between the image producing system on the one hand, and the feed head and holder assemblies on the other hand, will be apparent to those skilled in the art.

To further improve the usefulness of the described embodiment of the apparatus, a light transparent cover is provided on the holder assembly juxtaposed to the film strip storage jacket and opposite the platform. The image production system includes a projection lens supported so as to contact a surface of the cover, thereby precisely determining the distance between the lens and the storage jacket and assuring a sharply focused image.

The invention also includes in the feed head assembly structural elements which define at least one and, in the described embodiment, a pair of apertures lying along a light path from the light source. The pair of apertures are positioned along a planar portion of the film strip feed path and one to either side of a film strip cutting mechanism. Also provided are a pair of light transparent elements which are positioned opposite each of the apertures on an opposite side of the feed path. Each has an exposed surface distal to the aperture, which forms a common planar surface with the exposed surface of the transparent cover of the holder assembly allowing the projection lens to "float" on the common surface for viewing film strip frames located on the platform or over the apertures in the feed head assembly. It is envisioned in an alternative embodiment that in addition to an operator viewing capability, the apparatus includes a copying head interfacing with the projection lens to produce hard copies of the film strip segment frame images.

A second important aspect of the present invention is a film strip jacket loading apparatus including means for supporting separate feed head assembly and jacket support platform or tray to allow transverse movement of the platform with respect to the feed head assembly and its contained film strip feed path and to provide accurate alignment at each of a plurality of transverse positions by engaging together the platform and the feed head at any of the positions. According to this aspect of the invention, means such as a track is provided along the one side of the platform adjoining the feed head assembly and is adapted to engage with the feed head assembly to align the platform at any of several predetermined positions where openings for each pocket of the jacket are located. In the described preferred embodiment, a mouth structure is provided as part of the feed head assembly which defines a portion of the feed path and protrudes from the assembly towards the platform. The track includes structural elements for engaging with the mouth structure. In particular, the mouth structure of the present invention is formed by a base, which supports the film strip segments, and a pair of side walls on opposing sides of the base. The track includes a plurality of gear teeth spaced along the one side of the platform so as to bracket the side walls of the mouth structure when the mouth structure is located at one of the predetermined positions.

A third important aspect of the invention is a convenient means for operator positioning of the film storage jacket holder tray transversely with respect to the feed head. According to this aspect of the invention, a film strip loading apparatus includes a feed head assembly with film strip feed path, a platform or tray adjoining the feed head for receiving the film strip storage jacket, and mounting elements supporting and providing transverse movement of the platform with respect to the feed head and film strip feed path. In particular, the mounting elements support the platform for rotation into and away from engagement with the feed head assembly and also bias the platform into engagement with the feed head. In the described embodiment, the cover provided over the platform and jacket cooperates with the platform to free the platform for movement with respect to the feed head. The cover is hingedly attached to the platform and has attached to itself a pivot arm or other suitable means for applying force against the feed head assembly when the cover is rotated away from the platform. The feed head assembly of the subject invention includes a cantilever arm adapted to cooperate with the pivot arm to act as a fulcrum resisting the force causing the platform to rotate away from engagement of the feed head assembly when the cover is lifted from the platform, thereby freeing the platform for transverse movement with respect to the feed head assembly. Although this platform freeing mechanism is described with respect to the subject invention, it is envisioned that it may be usefully employed with other similar devices including the strip loading device of the aforesaid U.S. Pat. No. 4,258,531. It is further envisioned that some other lever might be provided in place of the cover.

Another important aspect of the invention is an improved film strip feed head assembly having a pair of viewing apertures along a planar portion of the film strip feed path through the head so as to provide a common focal plane for the film at the two apertures. The described embodiment of the new feed head assembly includes a first assembly element defining a first planar portion of a film strip feed path with a first aperture therethrough and a second assembly element adjoining the first assembly element and defining a second planar portion of the film strip feed path with a second aperture therethrough, the second assembly element being movable with respect to the first assembly element. The second element is biased with respect to the first element so as to form a common planar feed path across the two elements with the first and second planar portions. A pair of light transparent cover elements are provided, one opposite each of the two aperatures. The surface of each cover element opposite the opposing aperture forms part of a common planar surface to "float" a projection lens over the two aperatures. The described embodiments include the film strip storage jacket holder with light transparent platform or "tray" for supporting the film storage jacket and light transparent cover over the jacket and tray. The outer exposed surface of the cover forms an enlarged common planar surface with the surfaces of the two light transparent elements. The apparatus also includes a first frame structure mounting the projection lens, and a second frame structure in the form of a carriage or dolly movable with respect to the first frame structure and mounting the film strip storage jacket holder and film strip feed head, such that the latter assemblies are movable with respect to the projection lens so that the lens can access the enlarged common planar surface formed by both the jacket holder and the feed head assembly.

BRIEF DESCRIPTION OF THE DRAWINGS

These and other inventive aspects of the invention will become apparent from a review of the following detailed description of the invention and an examination of the accompanying figures in which.

DETAILED DESCRIPTION OF THE INVENTION

Figure 1:
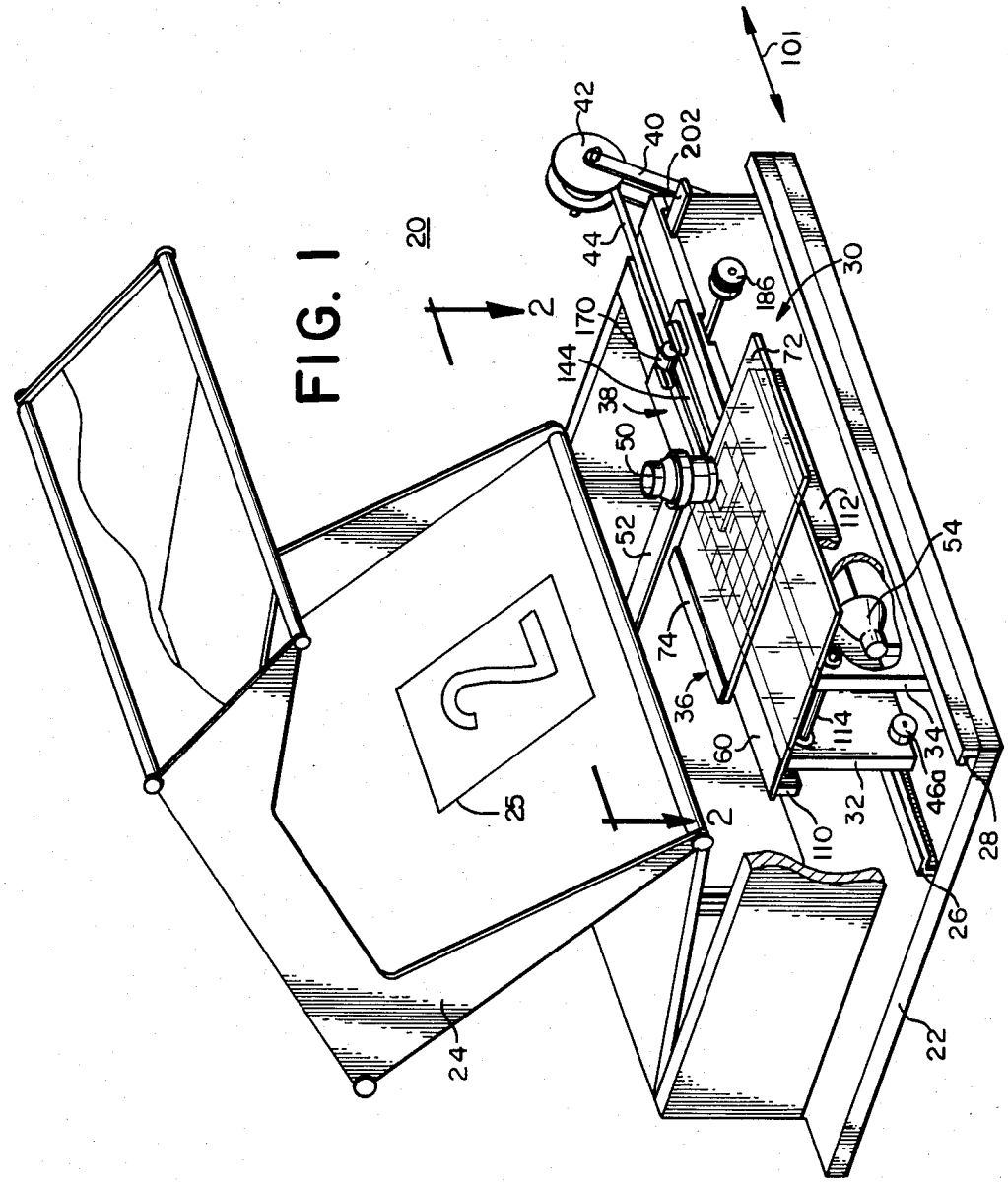
FIG. 1 is a partially broken-away view of a first embodiment of the invention.
Figure 2:
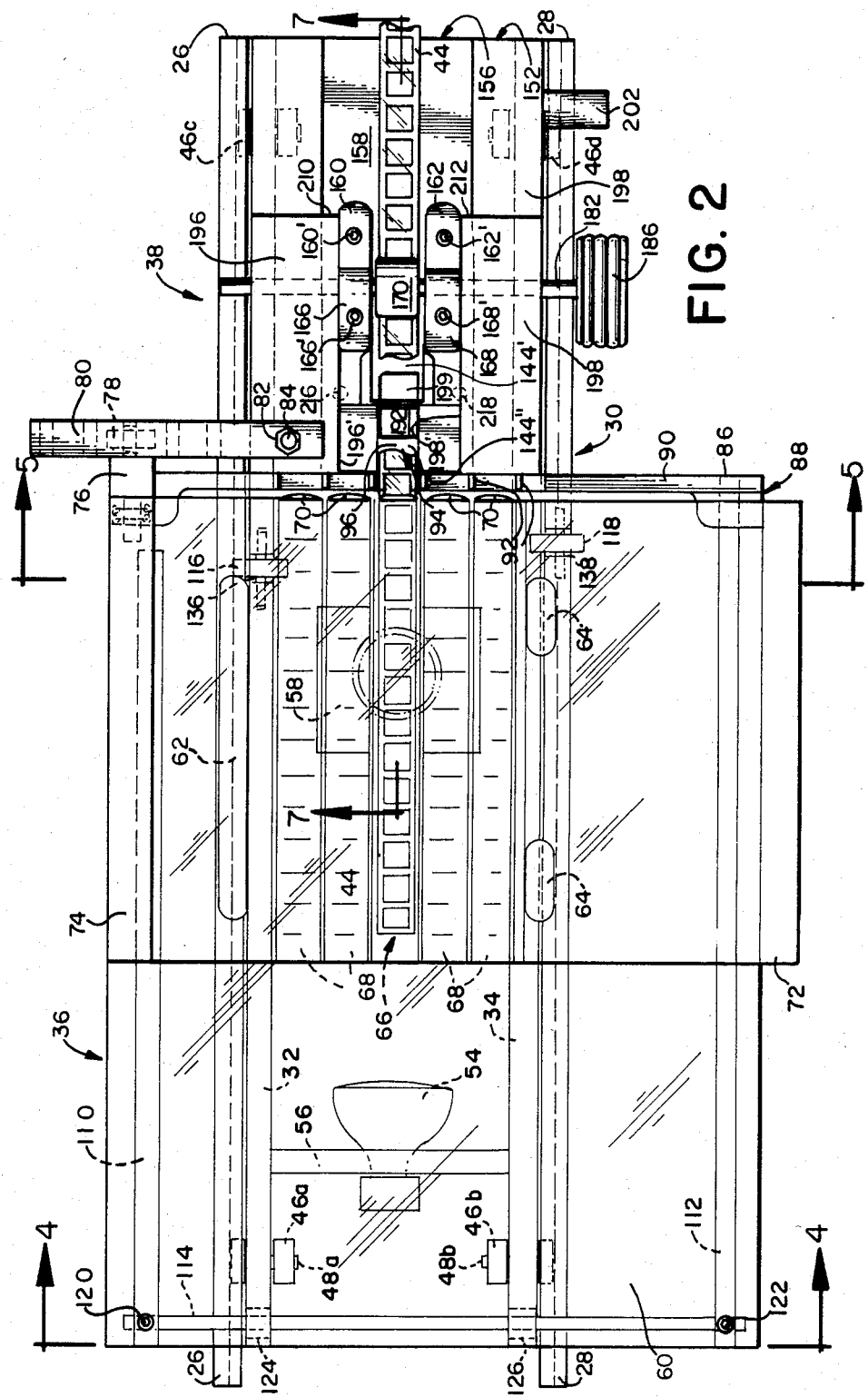
FIG. 2 is a plan view of the feed head assembly and jacket holder assembly along the lines 2—2.

FIG. 1 depicts a first embodiment 20 of the invention which includes a stationary frame 22 supporting an operator viewing screen 24, and having a pair of parallel and opposing rail elements 26 and 28 defining a path of movement for a second frame assembly or carriage 30 movable as indicated by connected arrows 101 with respect to the stationary frame 22. A pair of vertical structural elements or "beams" 32 and 34 support a microfilm jacket holder assembly 36, a feeder or feed head assembly 38, and a support arm 40 for receiving a spool 42 mounting a continuous strip of microfilm 44, or other film, for storage in segments. The movable frame 30 is supported by four pairs of wheels 46a, 46b, 46c, and 46d located at either end of either structural element 32 and 34. One of a pair of wheels 46a can be seen in FIG. 1 supporting the one corner of the carriage. Similar sets of wheels are located at the remaining three corners of the carriage 30 as indicated in FIG. 2. A projection lens 50 is mounted to the stationary frame 22 by a cantilever arm 52. The jacket holder assembly 36 includes a light translucent or preferably transparent platform or tray 60. A light transparent cover 72 is attached by means of a hinge assembly 74 to an edge of the platform 60. A pair of beams 110 and 112 fixedly attached to the bottom of tray 60, and shaft 114 fixedly connected to beams 110 and 112 and passing through beams 32 and 34, rotatably support the platform 60 at its end distal to the feed head 38. A lamp 54 illuminates portions of the film strip 44 in the feed head 38 and platform assembly 36, as will be later described, causing an image 25 of one or more frames of film 44 on the platform 36 or feed head 38 to be projected onto the screen 24. An operator controlled lever 202 is provided for cutting the strip 44 into segments, while an operator controlled wheel 186 drives a second wheel (hidden) cooperating with a third wheel 170 for propelling the strip 44, and segments thereof, through the feed head 38 along a feed path indicated generally at 144. The projection lens 50 "floats" on an enlarged surface formed by the upper surface of the cover 72 and upper surfaces of light transparent elements over the feed path 144. If desired, suitable means may be provided so as to fix the position of the carriage 30 with respect to the lens 50. For example, the rail 28 might be provided with a plurality of grooves and an operator manipulated, rotatable lever attached to beam 34 (neither depicted) with an end which may be inserted into a selected one of the grooves to act as a detent between carriage 30 and frame 22.

Figure 3:
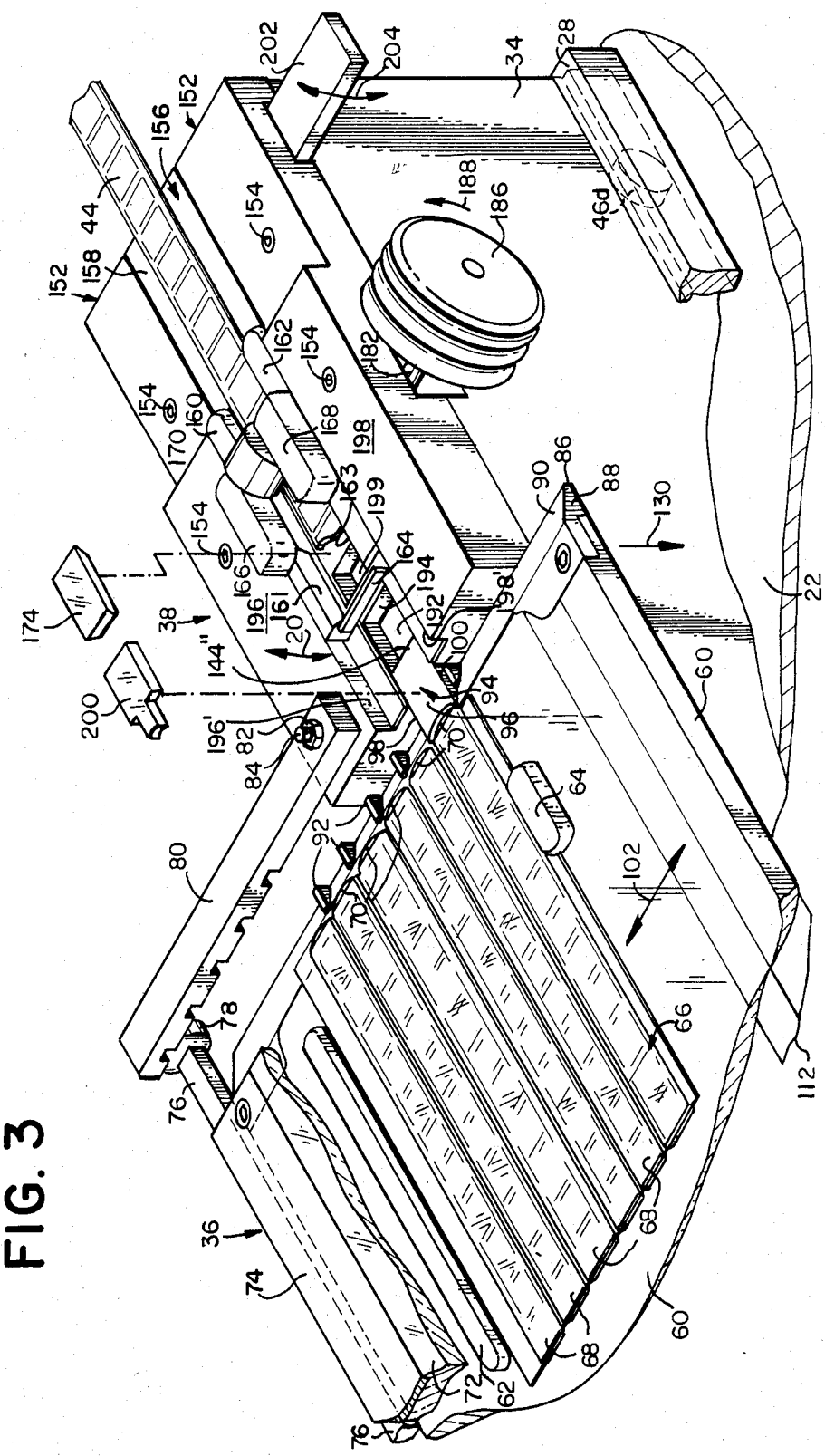
FIG. 3 is a partially exploded, perspective view of the feed head assembly and jacket holder.

Turning now to FIGS. 2 and 3 depicting the platform 36 and feed head 38 assemblies in greater detail, the tray 60 mounts an elongated upper guard 62 and pair of lower guards 64 for positioning a microfilm storage jacket 66 with respect to the feed head assembly 38. The guards 62 and 64 may be integrally formed with the platform 60 or attached thereto by adhesives or other conventional means. (One guard 64 is omitted from FIG. 3 for clarity.) The jacket 66 is of a conventional design and formed by a pair of opposing planar sheets of a transparent plastic material bonded so as to form a plurality of parallel and longitudinally extending pockets 68 for receiving lengths of film for storage. Each pocket 68 has an opening 70 on one side of the jacket and located at an edge of the jacket adjoining the feed head assembly 38 for receiving the microfilm strip. The apparatus may be used with a conventional jacket having an aperture, or a slit-opening jacket of the type described in U.S. Pat. Nos. 4,173,837 and 4,170,021, incorporated herein by reference. Attached to the cover 72 is an arm 76 having a wheel 78 at one end thereof. The wheel 78 rides in a track formed by a second cantilever arm 80 fixedly attached to the feed head assembly 38 by a nut 82 and bolt 84 or other suitable means. Attached to the one edge 86 of the platform 60 adjoining the feed head assembly 38 is a track 88 having a beveled surface 90 facing the feed head assembly 38, and a plurality of teeth 92 projecting at regularly spaced intervals along the beveled edge 90 which bracket a mouth assembly 94 projecting from the feed head assembly 38. The mouth assembly includes a base 96 which defines a portion of the feed path 144 extending through the feed head assembly 38 supporting the film strip 44 and a pair of side walls 98 and 100 (see FIG. 3) which confine the film strip to the base 96. The teeth 92 are spaced along the beveled edge 90 such that adjoining pairs of teeth 92 bracket the mouth 94 interfitting with the side walls 98 and 100 thereby rigidly positioning the mouth assembly 94 at predetermined positions along the one edge 86 of the platform coinciding with the locations of the pockets 68 and openings 70. The teeth 92 are located nearest the forward edge 86 of the beveled surface 90. The teeth 92 do not extend the entire width of the beveled surface 90, so that the leading edge of the storage jacket adjoining the slots 70 may be inserted into a space formed between the beveled surface 90 and a lower surface 97 (see FIG. 7) of the mouth assembly 94. In this position, the jacket pocket opening 70 adjoining the mouth 94 is held open to receive the film strip. The arrangement depicted can also be used in film strip storage jacket loading apparatus employing a pair of platforms in series as is described and claimed in U.S. Pat. No. 4,231,214, incorporated by reference herein. In such a system, the first platform, located adjoining to the feeder head assembly, would be provided with at least one structural assembly at the end of the platform distant from the feed head assembly, which would interfit with a track assembly for positive alignment of the two platforms. The teeth 92 also rise above the plane of the platform 60 and are used to position the jacket 66 laterally with respect to the feed head 38 and mouth assembly 94.

Figure 5:
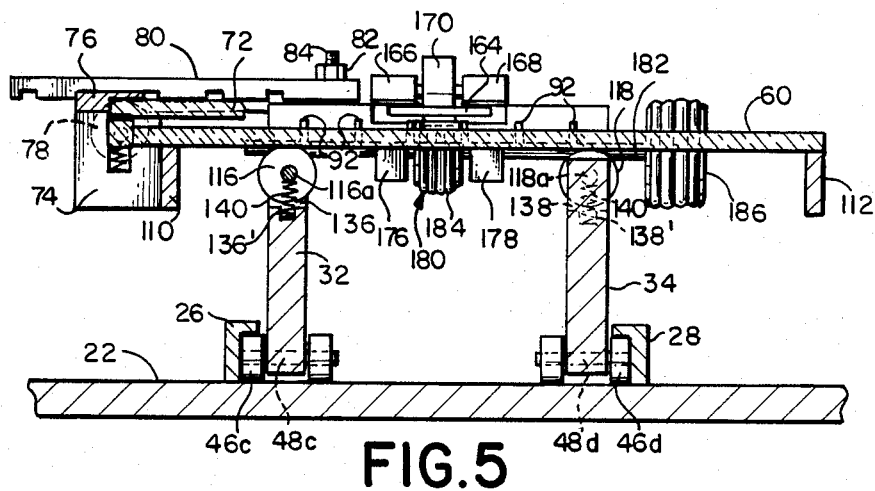
FIG. 5 is a transverse section view of the apparatus along the lines 5—5 of FIG. 2.
Figure 7:
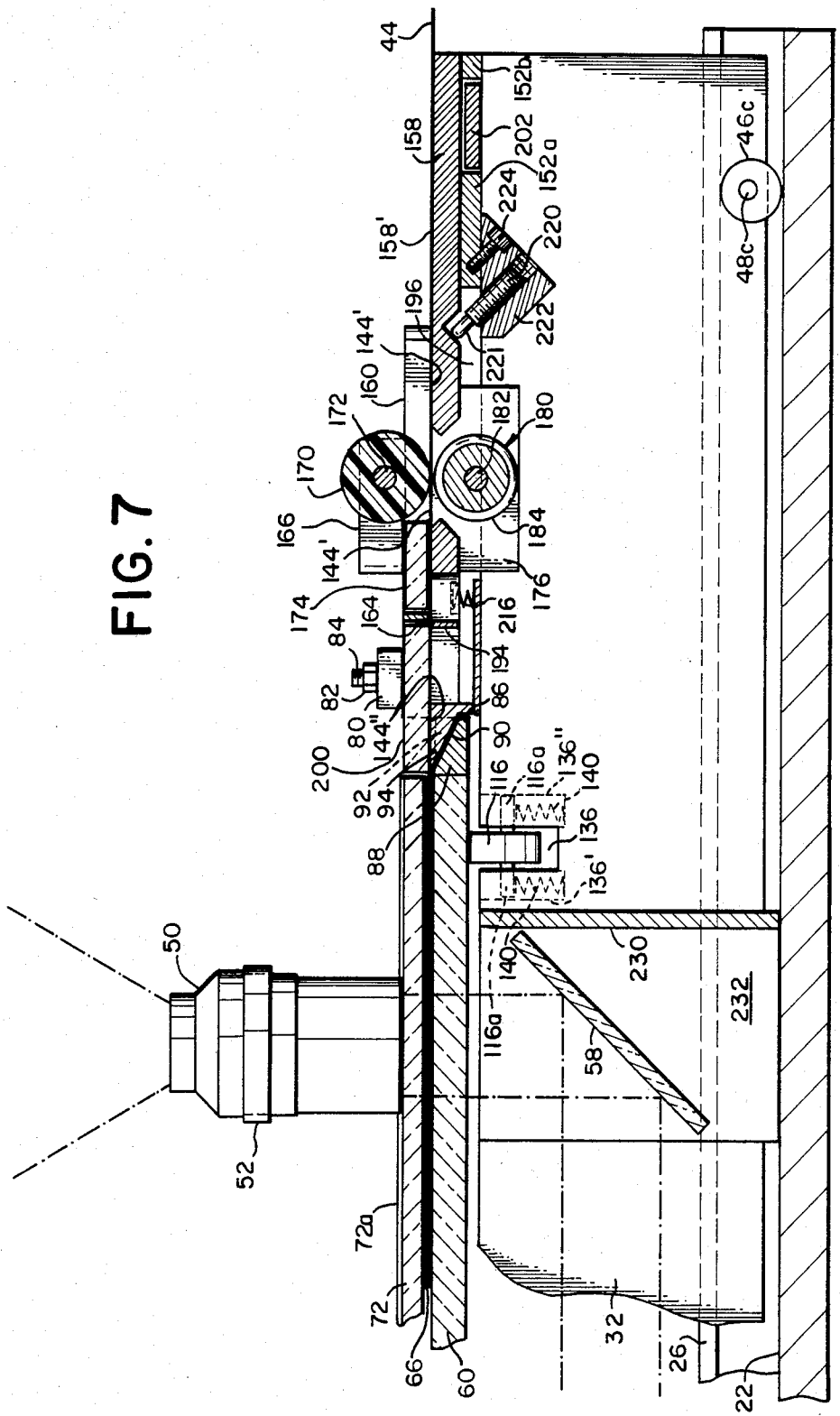
FIG. 7 is a side-section view of the apparatus along the lines 7—7 of FIG. 2 depicting the film strip feed path.

Looking at FIG. 2, the platform 60 is supported by means of vertical structural elements (beams) 110 and 112 attached to the bottom surface of the platform 60 by screws or other suitable means (not depicted), and supported with respect to the vertical frame elements 32 and 34 of the carriage assembly 30 by means of a shaft 114 and wheels 116 and 118. The shaft 114 is attached to the structural elements 110 and 112 by set screws 120 and 122 or other means. The shaft 114 is in turn supported by soft metal collar bearings 124 and 126 pressed into suitable bores in the structural elements 32 and 34, respectively, or by other suitable means. The platform assembly 36 is free to rotate about the shaft 114 into the depicted plane (downwardly as indicated by arrow 130 in FIG. 3) allowing disengagement of the teeth 92 from the mouth assembly 94. Each wheel 116 and 118 is located in a cutout 136 and 138, respectively, in the upper surface of each vertical frame element 32 and 34, respectively, and, as better seen in FIG. 5, is supported on an axle 116a and 118a, respectively. As seen in FIG. 7, the ends of axle 116a are confined to vertical movement in the grooves 136' and 136" (both indicated in phantom). The wheel 116 is biased upwardly by compression springs 140 at either end of the axle 116a in the depicted grooves 136' and 136". The wheel 118 incorporates a similar mounting arrangement with grooves (one groove 138' partially indicated in FIG. 5) and springs. By pressing downward on the platform assembly 36 (or cover 72), near the side proximal to the feed head 38, an operator can disengage the teeth 92 from the mouth assembly 94 and move the platform assembly 36 transversely with respect to the feed head 38 and the film strip feed path 144 therethrough, as indicated by arrow 102 (FIG. 3), for realignment of the mouth assembly 94 with another position along the edge 86 and another pocket 68 of the jacket 66.

Figure 6:
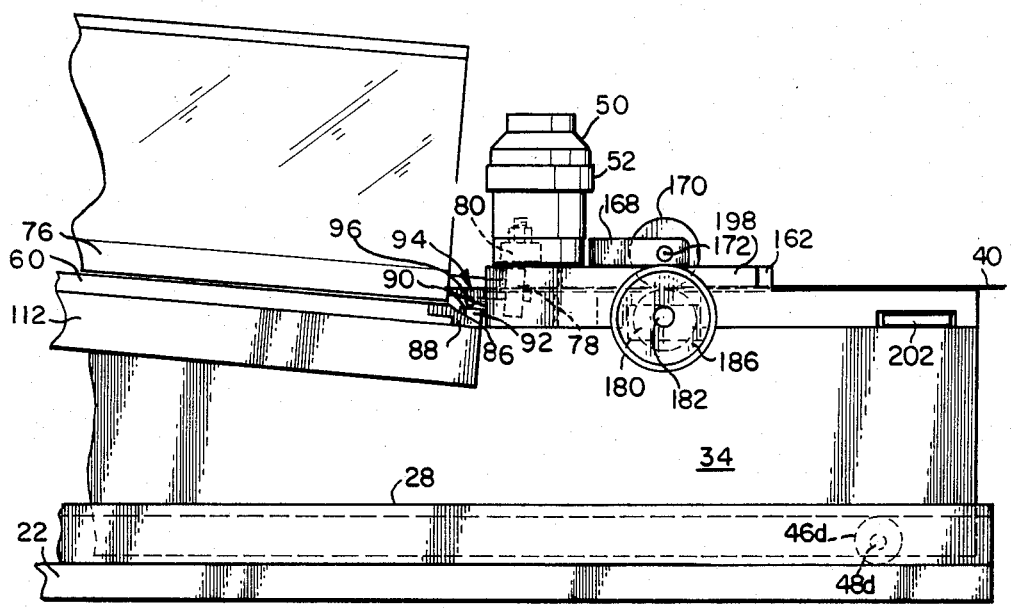
FIG. 6 is a side view of the feed head assembly with the jacket holder tray in a depressed position disengaged from the feed head for transverse positioning.

In the described embodiment, the platform assembly 36 is automatically disengaged when the cover 72 is lifted. This disengagement is depicted in FIG. 6. The angle of depression of the platform 60 is exaggerated to distortion so as to depict disengagement by rotation in the limited space of the figure. Upward movement of the cover 72 and attached arm 76 and wheel 78 (hidden in FIG. 6) is resisted by the cantilever arm 80 fixedly attached to the feed head assembly 38, resulting in a downward force being passed through the hinge 74 to the platform 36 causing the platform 36 to rotate downwardly. The platform 36 is normally biased upwardly against the feeder assembly 38 and mouth assembly 94 by means of the spring supported wheels 116 and 118. Alternatively an operator may press down on the cover 72 or tray 60 to disengage the teeth 92. Once freed, the entire platform assembly 36 may be moved transversely with respect to feed head 38 and feed path 144 as indicated by arrow 102 in FIG. 3.

Returning again to FIG. 2, the feed head assembly 38 is formed by two major interconnected subassemblies, a first subassembly 152 which is fixedly mounted to the vertical frame elements 32 and 34 of the carriage assembly 30 by set screws 154 (depicted for clarity only in FIG. 3) or other suitable means and a second subassembly 156 pivotally mounted to the first subassembly 152. The pivotable subassembly 156 is formed by a base plate 158, the upper surface 158' of which (FIG. 7) supports a continuous strip of film 44 being fed from the spool 42 (not depicted after FIG. 1) and defines a first linear portion 144' of the feed path 144 (see FIG. 1). A pair of upright members 160 and 162 are attached to the base piece 158 by screws 160' and 162' and form side walls of the feed path portion 144'. The elements 160 and 162 also mount the additional structural elements 166 and 168 by screws 166' and 168' which in turn mount an idler wheel 170 supported on an axle 172 (labelled in FIG. 6 for clarity). The elements 160 and 162 mount at one end a cutting blade 164 (see FIG. 3). The elements 160 and 162 are beveled along a portion of their inner facing side wall surfaces 161 and 163, respectively near a cutting blade 164 to receive and support over the film strip 44 a light transparent glass or plastic cover element or insert 174 (shown in FIG. 3). The idler wheel 170 cooperates with a second wheel 180 (see FIG. 7) to propel the film strip segment 44 through the feed head assembly 38. As shown in FIG. 7, the second wheel 180 is rotatably mounted to the pivotable subassembly 156 by an axle 182 carried in structural element 176 attached to element 160 and a similar element 178 (depicted only in FIG. 5) attached to structural element 162. The wheel 180 has a soft outer surface formed with a plurality of ribs 184 for frictionally engaging the film 44 without damage. Rotation of the operator wheel 186 at an end of the axle 182 in the direction of the arrow 188 (FIG. 3) propels the film strip 44 across the planar base piece 158 beneath the cutting blade 164 and onto a planar base 96 of the mouth assembly 94.

Again in FIG. 3, first aperture 199 is provided in the base 158 to allow an operator to view the first frame in the film strip 44 upstream from the blade 164. A similar, second aperture 192 is provided in the fixed subassembly 152 to allow the operature to view the last frame in a segment of film strip 44 downstream from the blade 164. The aperture 192 is formed in part by the mouth assembly 94 and in part by a stationary cutting blade 194 (see FIG. 3) fixedly attached to the fixed subassembly 152. Opposing wall surfaces 196' and 198' of raised ends 196 and 198 of the fixed subassembly 152 are configured to receive and support a second light transparent glass or plastic cover element or insert 200 (see FIG. 3) opposite a second linear portion 144" of the feed path 144 through the feed head assembly 38. This portion 144" is defined by the top of the stationary cutting blade 194, aperture 192 and base 96 of the mouth 94. The fixed assembly 152 is formed by a single machined block having raised ends 196 and 198 (see FIGS. 2 and 3) and cross members 152a and 152b (see FIG. 7). The mouth 94 is fitted between ends of elements 196 and 198. The second subassembly 156 is rotatably pivotable with respect to the fixed subassembly 152 for upward and downward movement of the cutter blade 164 as indicated by the arrow 20 in FIG. 3. The lever 202, also movable in the up and down direction as indicated by arrow 204, is provided for operator movement of the pivotable subassembly 156 thereby allowing the operator to cut the continuous film strip 44 to provide a segment for insertion into the jacket 66. After cutting, the severed segment is propelled along the feed path portion 144" and from the mouth assembly 94 into the jacket 66 by the following continuous film strip 44, itself propelled by the wheels 170 and 180. The pivotable subassembly 156 pivots about structural elements 196 and 198 at the points 210 and 212, respectively (see FIG. 2), where the raised end portions 196 and 198 of the fixed assembly 152 overhang the movable plate 158.

The method of pivotal mounting of the second subassembly 156 to the first subassembly 152 is best depicted in FIG. 7. Springs 216 and 218 (indicated in phantom in FIG. 2) are provided in between the corners of the base piece 158 and plates, one of which 214 is depicted in FIG. 7, attached to and forming a portion of the first fixed assembly 152 for biasing the rotatable assembly 156 with the movable blade 164 into an upward, "open" position (also shown in FIG. 3) where the film strip 44 passes beneath the movable blade 164 and above the fix blade 194. The second subassembly 156 is also biased horizontally against the first subassembly 152 by means of an adjustment screw assembly 220 containing spring loaded pin 221 protruding therefrom and a threaded exterior screwed into a threaded bore in a block 222 mounted by screw 224 or other suitable means to cross-member 152a of the first subassembly 152. Thus, lowering the operator lever 202 causes the end of the lever to strike plate 158 pivoting it against overhangs of raised ends 196 and 198 and a downward motion of the movable blade 164 severing the film strip at the point between the two blades 164 and 194. The upper surfaces of the cover 72 and insert elements 174 and 200 form the enlarged common planar surface (at least when the movable blade 164 is in the "open" position) upon which the projection lens 50 rests or "floats".

Figure 4:
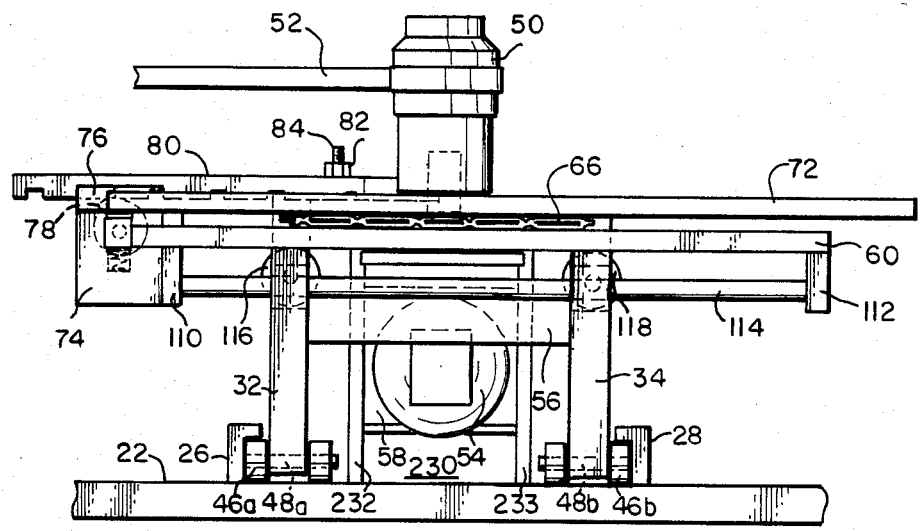
FIG. 4 is an end view of the apparatus along the lines 4—4 of FIG. 2.

The electric light assembly 54 is provided for backlighting the storage jacket 66 through the light transmissive platform 60 and transparent cover 72, and backlighting those portions of the film strip 44 to either side of fixed and movable blades 164 and 194 through the two apertures 190 and 192 and associated inserts 174 and 200, respectively. In the described embodiment, the light assembly 54 is mounted to the movable carriage assembly 30 by a crossmember 56 (FIGS. 2 and 4). Light from the assembly 54 is reflected upwardly through the holder assembly 36 and feed head assembly 38 by means of a mirror 58 fixedly mounted to the base of the stationary frame 22 by suitable support members 230, 232, and 233 (see FIGS. 4 and 7). The mirror 58 is positioned directly beneath the projection lens 50 so as to reflect light upwardly into the lens. The carriage 30 may be moved laterally as indicated by arrows 101 (FIG. 1) and the platform assembly transversely as indicated by arrows 102 (FIG. 3) so as to position either aperture 190 or 192 or any portion of the microfilm storage jacket 66 between the projection lens 50 and mirror 58. Of course, other arrangements are possible.

For example, a light assembly 54 may be sunk into the frame 22 at the location of the mirror 58 to project directly upwardly into the projection lens. The holder assembly 36 and the feed head assembly 38 might be fixedly mounted and the light source 54, projection lens 50 and associated projection components such as the viewer screen 24 made movable with respect to the jacket holder and feed head assembly.

Figure 8:
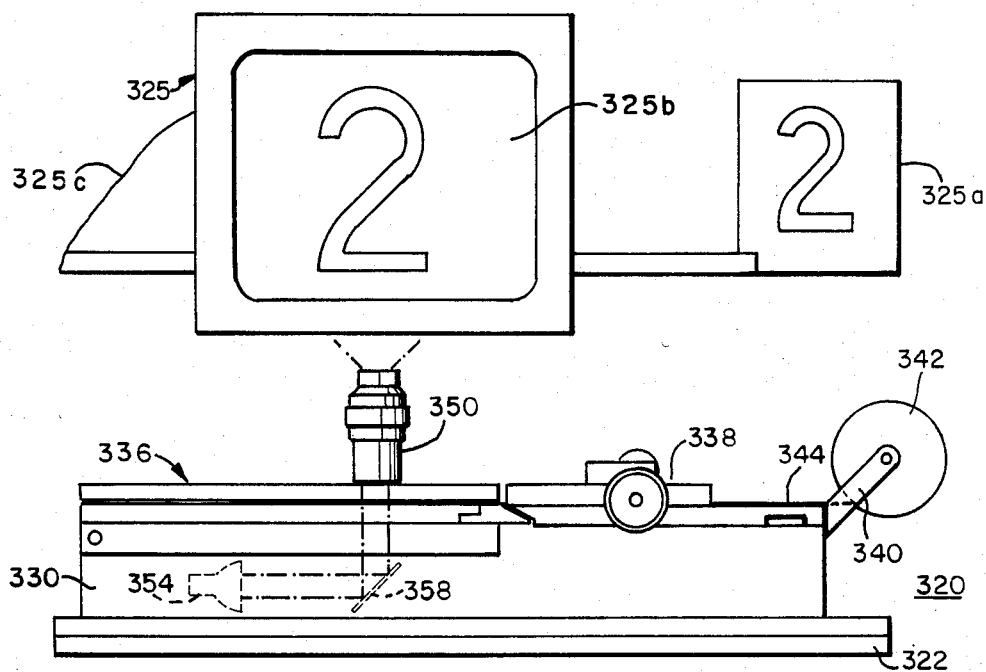
FIG. 8 is a diagrammatic view of a second embodiment combining a hard copier operator projection screen head with the jacket loading apparatus.

FIG. 8 depicts diagramatically, an envisioned, second embodiment 320, which includes a fixed base 322, mounting a light source 354 and mirror 358 (both depicted in phantom) and projection lens 350; and a carriage 330 movable with respect to the stationary frame 322 and mounting a platform assembly 336, a feed head assembly 338 and arm 340 supporting a spool 342 of film 344. The elements described thus far correspond substantially or equivalently to the similar elements in the embodiment 20 of FIGS. 1–7. In place of the viewing screen 24, the embodiment 320 includes a combined copier/viewing screen assembly 325 depicted diagramatically and similar in function to those found on conventional microfilm feeder/copiers which allows an illuminated film strip image to be hard copied (as represented by a copy 325a issuing from the device 325) or viewed by an operator (as represented by screen 325b). One such viewer/copier assembly embodiment is shown, for example, in U.S. Pat. No. 3,860,189 to Cassano et al. which is incorporated by reference herein. The assembly 325 is supported by a conventional housing structure 325c depicted diagramatically in broken-away form.

While conventional microfilm viewing apparatus and the described embodiments use a projection lens 50 or 350 to transmit an optical image, it is envisioned that other known means for transmitting the image, i.e. the conversion of the image into an electrical signal which is thereafter transmitted, may be substituted for or used in conjunction with the projection lens 50 or 350.

While various embodiments of the invention have been described and improvements thereto suggested, other variations and modifications to the described embodiments will occur to one who is skilled in this art. The invention is therefore not limited to the described embodiments but rather to those set forth in the following claims.

What is claimed is:

1. An apparatus for loading a film strip segment into a film strip storage jacket comprising:
   feed means for propelling a film strip segment along a film strip feed path through the feed means;
   holder means adjoining said feed means for positioning a film strip storage jacket to receive the film strip segment from said film strip feed path;
   illumination means for illuminating a film strip segment positioned in said film strip jacket; and
   means for transmitting an image of the illuminated film strip segment.

2. The apparatus of claim 1 wherein said holder means comprises a light transmissible platform supporting the film storage jacket and wherein said illumination means illuminates said film strip jacket through said light transmissible platform.

3. The apparatus of claim 2 further comprising:
   first frame means for supporting said means for transmitting;
   second frame means for supporting said holder means; and
   said first frame means and second frame means being movable with respect to one another.

4. The apparatus of claim 3 wherein said holder means further comprises a light transparent cover juxtaposed to the film strip storage jacket opposite said platform; and said means for transmitting comprises a projection lens attached to said first frame means and contacting an exposed surface of said light transparent cover opposite the jacket.

5. The apparatus of claim 4 wherein said feed means further comprises:
   one or more structural elements defining an aperture through said feed path along a light transmission path from said illuminating means; and
   a light transparent element across said light transmission path opposite said aperture and having a surface forming a common surface with said exposed surface of the transparent cover.

6. The apparatus of claim 1 wherein said means for transmitting further comprises copying means for producing a hard copy of said image.

7. An apparatus for inserting film strip segments into a film strip storage jacket having a plurality of pockets, each pocket having an opening along one edge of the jacket for receiving a film strip segment, comprising:
   a platform for receiving and supporting the film strip storage jacket with said openings located at predetermined positions along one side of the platform;
   feed means adjoining said one side of the platform for propelling film strip segments along a feed path to the platform;
   means for supporting said platform and said feed means and for providing movement between the platform and the feed means transverse to the feed path; and
   means for engaging together the feed means and the platform with the feed path located at one of each of said predetermined positions.

8. The apparatus of claim 7 wherein said platform is transversely movable with respect to said feed means feed path; and said means for engaging comprises track means along said one side of the platform adapted for engaging with said feed means at each of said predetermined positions.

9. The apparatus of claim 8 wherein said feed means comprises a mouth structure protruding towards said platform and defining a portion of said feed path; and said track means comprises means spaced along said one side of the platform for engaging with said mouth structure.

10. The apparatus of claim 9 wherein said mouth structure comprises:
    a base for supporting film strip segments; and
    a pair of sidewalls on opposing sides of the base; and wherein the means for engaging comprises:
    a plurality of gear teeth spaced along said one side of the platform to bracket the side walls of the mouth structure when positioned at any of the predetermined positions.

11. The apparatus of claim 7 wherein said means for supporting said platform and said feed means comprises:
    means rotatably supporting the platform for engagement and disengagement of said track means with said feed means; and
    means for biasing said track means into engagement with said feed means;
    and said apparatus further comprises:

lever means cooperating with said platform for disengaging said platform from said feed means.

12. The apparatus of claim 11 wherein said lever means comprises:
   a cover hingedly attached to platform; and
   pivot means attached to said cover for applying a force against the feed means when said cover is lifted away from said platform;
and wherein said feed means comprises
   fulcrum means adapted to cooperate with said pivot means for resisting said force whereby said platform is rotated away from engagement with said feed means when said cover is lifted away from said platform.

13. An apparatus for loading a film strip into a storage jacket comprising:
   a holder for receiving the storage jacket; and
   a feed head assembly adjoining the holder and having a film strip feed path for conducting film strip through the feed head to the holder, and two or more positions along the feed path for viewing portions of the film strip at said positions, at least that portion of the feed path extending between the positions and through the positions being planar; and
   means for viewing said portions of the film strip at said positions.

14. The apparatus of claim 13 wherein said feed head assembly comprises:
   a first assembly element defining a first planar portion of the film strip feed path;
   a second assembly element adjoining said first assembly element and defining a second planar portion of the film strip feed path, said second assembly element being movable with respect to said first assembly element for severing the film strip at a point between the two assembly elements;
   a first aperture through the first assembly element and along the first planar portion of the feed path;
   a second aperture through the second assembly element and along the second planar portion of the feed path;
   means biasing the second assembly element with the first assembly element for forming a common planar feed path across said first planar portion and said second planar portion; and
wherein said apparatus further comprises:
   means for illuminating portions of the film strip through said first aperture and second aperture.

15. The apparatus of claim 14 wherein said feed head assembly comprises:
   a first light transparent element opposite said first aperture and having an outer surface distal to the first aperture;
   a second light transparent element opposite said second aperture and having an outer surface distal to the second aperture, said outer surface of the two light transparent elements forming a common planar surface over the two apertures;
and wherein said means for viewing comprises:
   a projecting lens contacting said common planar surface.

16. The apparatus of claim 15 wherein said storage jacket holder comprises:
   a tray for supporting a film strip storage jacket, at least a portion of the tray opposite the supported jacket being light transmissable; and
   a light transparent cover opposite said jacket and tray and having an outer surface forming an enlarged, common planar surface with the outer surfaces of the two light transparent elements;
and the apparatus further comprises:
   a first frame structure mounting said projection lens; and
   a second frame structure mounting said storage jacket holder and feed head assembly, said first frame structure and said second frame structure being movable with respect to one another.

* * * * *